May 4, 1965 F. HEDERHORST 3,181,360
GAS DISPLACEMENT METER
Filed Dec. 8, 1961

INVENTOR.
FRED HEDERHORST,
BY *Frank S. Triodl*
ATTORNEY.

United States Patent Office 3,181,360
Patented May 4, 1965

3,181,360
GAS DISPLACEMENT METER
Fred Hederhorst, Baytown, Tex., assignor, by mesne assignments, to Esso Research and Engineering Company, Elizabeth, N.J., a corporation of Delaware
Filed Dec. 8, 1961, Ser. No. 158,024
3 Claims. (Cl. 73—270)

This invention relates to gas meters. More particularly, this invention is a new and improved gas displacement meter for measuring a continuous flow of gas.

Currently utilized gas measuring meters are not able to be used under all circumstances for one or more of the following reasons:

(1) These meters operate effectively only at atmospheric pressure or within a particular pressure range.

(2) Several of these meters are provided with packing glands through which leakage in or out of the system may occur.

(3) The composition of the gas being measured may be changed and/or contaminated while it is being metered.

(4) Temperature limitations may limit the temperature range for which the meter can be effectively used.

(5) Condensing liquids or entrained liquids seriously interfere with the free flow of gas through the meter.

(6) The accuracy of these meters is dependent upon the rate of flow of the gas.

The meter to be described herein will operate from full vacuum to elevated pressures. There are no packing glands through which leakage in or out of the system can occur. The composition of the gas flowing through this meter is not changed while it is being metered, and there are no temperature limitations except those which may be imposed by some of the elements in the meter which are around 500° F. Condensing liquids or entrained liquids do not interfere with the free flow of the gas through this meter, and the accuracy of the meter is independent of the rate of flow of the gas.

Briefly described, this invention includes a novel structure for continuously flowing gas to a gas displacement meter and measuring the amount of gas flowed to the meter. A housing is divided into two chambers by a flexible member. Alternately, one chamber is filled with the gas while a like amount of gas is expelled from the other chamber. Novel means are included in the structure for indicating the total amount of gas which has flowed from the housing.

Figure 1:
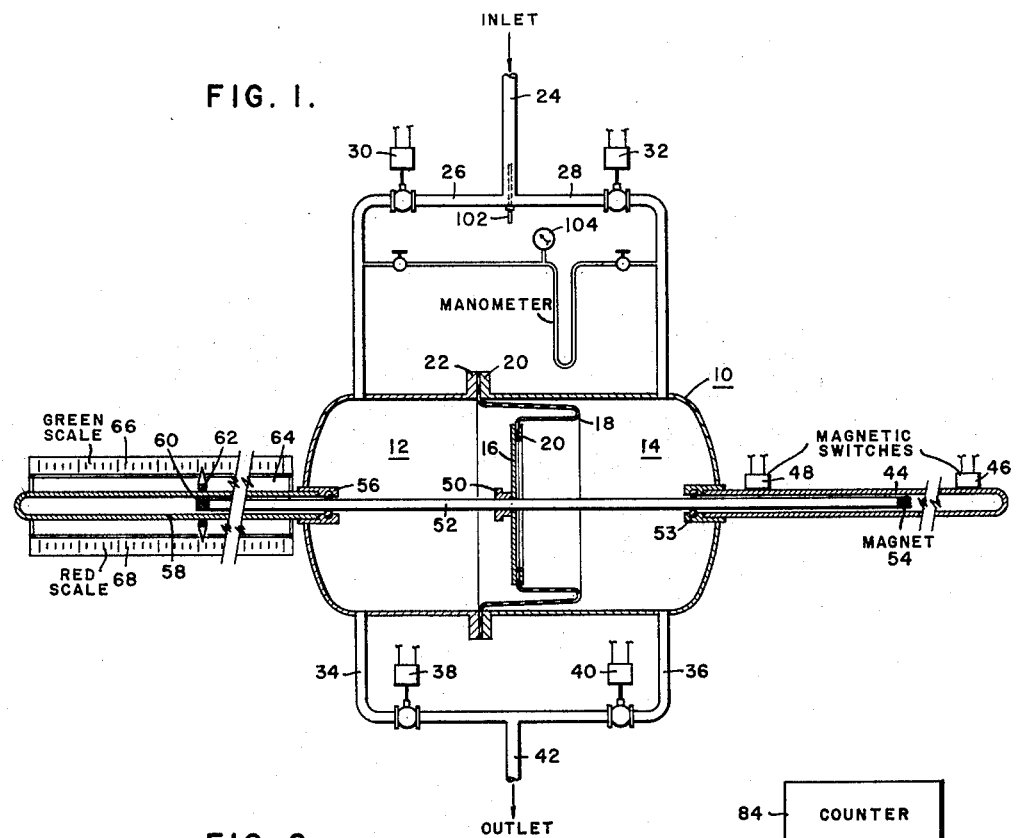
Figure 2:
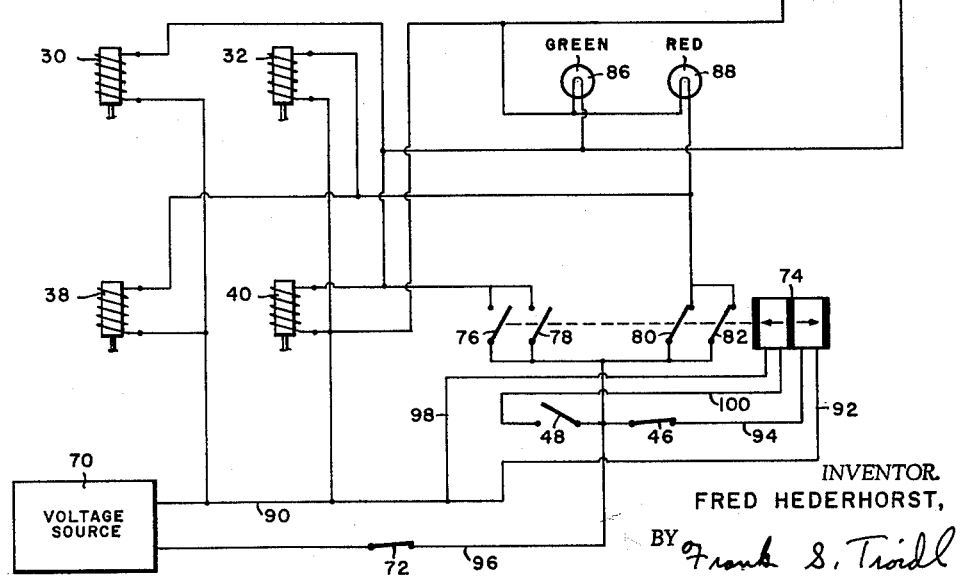

The invention, as well as its many advantages, will be understood by reference to the following detailed description and drawings in which:

FIG. 1 is a schematic elevational view of a preferred embodiment of my invention; and FIG. 2 is an electrical circuit diagram showing the electrical components of the new meter.

Referring to FIG. 1, the meter includes a substantially cylindrical housing 10. The housing 10 is divided into a first chamber 12 and a second chamber 14 by means of a flexible member.

The flexible member includes a diaphragm piston 16. The internal edge of the flexible diaphragm 18 is mounted to the piston 16 by means of a ring member 20. The outer edge of the flexible diaphragm 18 extends through the housing 10 and is mounted between the flange members 20 and 22. The diaphragm 18 is made of corrosion-resistant material such as Teflon or rubber.

A main gas inlet line 24 branches into a gas inlet line 26 and a gas inlet line 28 leading to chamber 12 and chamber 14, respectively. The flow of gas through lines 26 and 28 is controlled by means of solenoid valves 30 and 32, respectively.

Gas outlet lines 34 and 36 lead from the lower parts of chambers 12 and 14, respectively. Solenoid valves 38 and 40 control the flow of gas through lines 34 and 36, respectively. The gas which flows through either line 34 or line 36 also flows through the main gas outlet line 42.

A hollow finger member 44 is mounted on the side of housing 10 and extends outwardly from chamber 14 substantially along the axis of the housing 10. The finger 44 is made of high magnetic permeability material such as type 304 stainless steel, brass, copper, or glass. An outer magnetic switch 46 and an inner magnetic switch 48 are mounted on the outside perimeter of the finger 44.

The diaphragm piston 16 is provided with a support member 50 to which a shaft 52 is connected. The shaft 52 extends through support 50 with one end of shaft 52 extending through ball bushing 53 and reciprocating within the finger 44. The right-hand tip (looking at FIG. 1) is provided with a strong magnet 54.

The other side of shaft 52 extends through chamber 12 and through the ball bushing 56 into a finger 58 made of high magnetic permeability material. The left-hand tip of shaft 52 is also provided with a strong magnet 60. A magnetic follower ring 62 is slidably mounted about the finger 58 and within a sleeve 64. The follower ring 62 follows the reciprocating movement of the magnet 60. An upper scale 66 and a lower scale 68 are also provided.

FIG. 2 is an electrical schematic diagram of the electrical system used with my new gas displacement meter. Referring to FIG. 2, the solenoid valves and magnetic switches are indicated by the same numbers as used in FIG. 1. In addition, a voltage source 70 controlled by switch 72 is provided in the electrical system. The operation of the solenoid valves is controlled by the switches 46 and 48 through a double-pole latching relay 74. The relay 74 controls the positions of switches 76, 78, 80, and 82.

In operation, the gas to be measured flows through the gas inlet 24. At this time, the solenoid valves 30 and 40 are open. As the gas enters the chamber 12 through solenoid valve 30, the diaphragm piston 16 is pushed to the right to expel a similar quantity of gas from the chamber 14 out of the system through solenoid valve 40 and gas outlet 42.

As the diaphragm piston 16 changes position, its position is shown by the position of follower ring 62 along scale 66. The follower ring 62 follows the magnet 60 attached to the end of the shaft 52.

When the diaphragm piston 16 reaches its outermost right-side position, the magnet 54 attached to the opposite end of shaft 52 closes the magnetic switch 46. Looking at FIG. 2, it can be seen that with the switch 72 closed, the closing of magnetic switch 46 completes the electrical circuit through line 90, line 92, relay 74, line 94, and line 96 back to the voltage source 70. The actuation of relay 74 moves all of the switches 76, 78, 80, and 82 to the right as shown in FIG. 2. The opening of switches 76 and 78 breaks the electrical circuit to solenoid valves 30 and 40 deenergizing said valves allowing them to close. At the same time, the closing of switches 80 and 82 completes the electrical circuit through solenoid valves 32 and 38 energizing said valves to open them. At the same time, the green signal light 86 which was on while valves 30 and 40 were open now goes out; and the red signal light 88 goes on. These lights are for the purpose of showing which direction the diaphragm piston 16 is traveling so that the proper scale 66 or 68 can be read.

Valves 30 and 40 are now closed, and valves 32 and 38 are open. Thus, gas now flows from inlet 24 through line 28 into chamber 14, expelling a like amount of gas from chamber 12 through gas outlet 34 and outlet 42.

When the diaphragm piston 16 changes position, the magnet 54 closes magnetic switch 48. Previously, the magnetic switch 46 opened as the shaft 52 moved inwardly. The closing of switch 48 completes the circuit to voltage source 70 through line 90, line 98, relay 74, line 100, and line 96. When relay 74 is actuated, the positions of switches 76, 78, 80, and 82 are reversed from those shown in FIG. 2. Switches 80 and 82 are now open causing the de-energizing of solenoid valves 32 and 38. The opening of switches 80 and 82 also turns off the red light 88. The closing of switches 76 and 78 energizes the green light 86 and also solenoid valves 30 and 40 to open them. In addition, the closing of switches 76 and 78 completes the circuit through the counter 84 resulting in a one digit increase of the amount registered in the counter.

The above cycle of operation is then continuously repeated. The meter is calibrated by ascertaining its displacement per stroke. The amount of gas passing through the meter is then the number of strokes plus the percent of an additional stroke times the calibration factor times the correction for temperature and pressure.

The temperature may be measured by a thermometer, thermocouple, or other temperature sensing device 102 extending into inlet line 24. The pressure gauge 104 is to furnish the pressure for converting the volume of gas handled by the meter to standard conditions.

I claim:

1. A continuous flow gas displacement meter comprising: a housing; a flexible member mounted within said housing so as to provide a first chamber and a second chamber in said housing; a main gas inlet line; a first chamber gas inlet line and a second chamber gas inlet line, both branching from said main gas inlet line; a first chamber gas outlet line; a second chamber gas outlet line; a solenoid valve in each of said gas inlet lines, and a solenoid valve in each of said gas outlet lines; a hollow finger extending outwardly from said second chamber and made of magnetic flux conducting material; a shaft connected to the flexible member and extending into said hollow finger for reciprocal movement therein; a magnet on the outer end of said shaft; and an electrical circuit including a first magnetic switch adjacent the outer end of said finger and a second magnetic switch adjacent the inner end of said finger, said first magnetic switch being closed by movement of the shaft to its outermost position so as to close the first chamber gas inlet valve and the second chamber gas outlet valve, and open the second chamber gas inlet valve and first chamber gas outlet valve, the position of each of said valves being reversed when said first magnetic switch is opened, said second magnetic switch being closed when the shaft is moved to its innermost position, and a counter actuated each time the second magnetic switch is closed.

2. A continuous flow gas displacement meter in accordance with claim 1 wherein said electrical circuit also includes a first light actuated by the closing of the first magnetic switch and a second light actuated by the closing of the second magnetic switch, to indicate the direction of movement of the shaft.

3. A continuous flow gas displacement meter comprising: a housing; a flexible member mounted within said housing so as to provide a first chamber and a second chamber in said housing; a first chamber gas inlet line and a second chamber gas inlet line; a first chamber gas outlet line and a second chamber gas outlet line; a solenoid valve in each of said gas inlet lines, and a solenoid valve in each of said gas outlet lines; a shaft having a magnet on its outer end, said shaft being connected to the flexible member for reciprocal movement therewith, said shaft also extending out of said housing; a first magnetic switch located so as to be actuated when the shaft moves to its outermost position; a second magnetic switch located so as to be actuated when the shaft moves to its innermost position; and an electrical circuit including said first and second magnetic switches, said first magnetic switch being closed by movement of the shaft to its outermost position so as to close the first chamber gas inlet valve and the second chamber gas outlet valve, and open the second chamber gas inlet valve and first chamber gas outlet valve, the position of each of said valves being reversed when said first magnetic switch is opened, said second magnetic switch being closed when the shaft is moved to its innermost position, and an indicator actuated each time the second magnetic switch is closed.

References Cited by the Examiner
UNITED STATES PATENTS

| 1,470,381 | 10/23 | Lamb | 73—250 |
| 2,242,659 | 5/41 | Reid | 73—270 |
| 2,260,516 | 10/41 | Gerber | 73—209 |
| 2,405,140 | 8/46 | Grimm | 73—308 |
| 2,419,942 | 5/47 | Brewer | 73—209 |

RICHARD C. QUEISSER, *Primary Examiner.*

ROBERT EVANS, *Examiner.*